(12) United States Patent
Aso (10) Patent No.: US 11,192,193 B2
(45) Date of Patent: Dec. 7, 2021

(54) CUTTING INSERT

(71) Applicant: TUNGALOY CORPORATION, Fukushima (JP)

(72) Inventor: Takahiro Aso, Iwaki (JP)

(73) Assignee: TUNGALOY CORPORATION, Iwaki (JP)

(*) Notice: Subject to any disclaimer, the term of this patent is extended or adjusted under 35 U.S.C. 154(b) by 0 days.

(21) Appl. No.: 16/875,916

(22) Filed: May 15, 2020

(65) Prior Publication Data

US 2020/0376572 A1    Dec. 3, 2020

(30) Foreign Application Priority Data

May 31, 2019  (JP) .............................. JP2019-101920
Oct. 16, 2019  (JP) ................................. 2019-189633

(51) Int. Cl.
*B23C 5/20* (2006.01)
*B23C 5/10* (2006.01)

(52) U.S. Cl.
CPC .......... *B23C 5/202* (2013.01); *B23C 2200/08* (2013.01); *B23C 2200/12* (2013.01);
(Continued)

(58) Field of Classification Search
CPC ..... B23C 5/202; B23C 5/207; B23C 2220/24; B23C 2220/243; B23C 2220/246;
(Continued)

(56) References Cited

U.S. PATENT DOCUMENTS 5,052,863 A * 10/1991 Satran ................... B23B 51/048
                                                                              407/113
5,078,550 A *  1/1992 Satran ..................... B23C 5/202
                                                                              407/34

(Continued)

FOREIGN PATENT DOCUMENTS

JP       H06190624 A     7/1994
JP       2008213078 A    9/2008

*Primary Examiner* — Nicole N Ramos
(74) *Attorney, Agent, or Firm* — Studebaker & Brackett PC (57) ABSTRACT

An object of this disclosure is to provide a cutting insert that is shaped so that a major cutting edge is not damaged easily. In the cutting insert, a major cutting edge, a corner edge, a flat cutting edge and an inner cutting edge are formed on at least an upper surface, a protruding portion protruding outward is formed in a major cutting edge side surface portion of a side surface that corresponds to the major cutting edge, and a first section is formed in which, when viewed from above, the protrusion amount becomes smaller as the protruding portion separates from the corner edge. Furthermore, the cutting insert includes a first clearance angle changing portion in which a clearance angle becomes smaller as a major cutting edge flank portion formed in a major cutting edge side surface portion separates from the corner edge, and a second clearance angle changing portion in which the clearance angle becomes larger as the major cutting edge flank portion separates from the corner edge, wherein the first clearance angle changing portion is preferably positioned closer to the corner edge than the second clearance angle changing portion is, and, of end portions of the first clearance angle changing portion, the value of the clearance angle at a distal end portion from the corner edge is preferably negative.

6 Claims, 9 Drawing Sheets

(52) U.S. Cl.
CPC ............... *B23C 2210/0421* (2013.01); *B23C 2210/0442* (2013.01)

(58) Field of Classification Search
CPC ........ B23C 2220/283; B23B 2220/242; B23B 2220/245; B23B 27/145; B23B 27/1611
See application file for complete search history.

(56) References Cited

U.S. PATENT DOCUMENTS

| | | | |
|---|---|---|---|
| 5,382,118 A | 1/1995 | Satran et al. | |
| 8,057,132 B2* | 11/2011 | Johansson | B23C 5/202 407/113 |
| 9,511,427 B2* | 12/2016 | Horiike | B23B 27/145 |
| 2008/0304924 A1* | 12/2008 | Engstrom | B23C 5/202 407/114 |
| 2012/0009029 A1* | 1/2012 | Saji | B23C 5/207 407/67 |
| 2017/0326656 A1* | 11/2017 | Saji | B23C 5/109 |
| 2018/0339350 A1* | 11/2018 | Mura | B23C 5/207 |
| 2019/0030629 A1* | 1/2019 | Vlcek | B23C 5/2221 |
| 2019/0047059 A1* | 2/2019 | Shiroma | B23C 5/207 |

* cited by examiner

CUTTING INSERT

BACKGROUND

Field

The present invention relates to a cutting insert that is used with a cutting tool used for cutting, and particularly to a cutting insert used for a milling tool with a replaceable blade edge.

Description of Related Art

There has conventionally been a cutting insert for shoulder milling that has a substantially rectangular shape when viewed from above, as disclosed in Patent Publication JP-A-2008-213078. The major cutting edges formed on the longer sides process a wall surface, and the minor cutting edges formed on the shorter sides process a flat surface.

SUMMARY

Typically when a cutting edge bites into a workpiece, first, a part in the vicinity of a corner edge bites in, and then a part away from the corner edge gradually bites in. In this case, the load that is applied to the cutting edge right at the moment when the cutting edge bites into the workpiece is significantly greater than the load that is applied to the cutting edge after the cutting edge bites into the workpiece; thus, the cutting edge can easily be damaged right at the moment when biting into the workpiece. Therefore, in the cutting insert such as the one disclosed in Patent Publication JP-A-2008-213078 that has a positive clearance angle value of the major cutting edges, damage to the blade edge occurs easily, making it difficult to perform machining under higher load cutting conditions. The present invention was contrived in view of the foregoing problems, and an object thereof is to provide a cutting insert that is shaped so that major cutting edges thereof are not damaged easily.

A cutting insert according to the present invention includes: an inner cutting edge; a flat cutting edge connected to the inner cutting edge; a corner edge connected to the flat cutting edge; and a major cutting edge connected to the corner edge, wherein a side surface portion corresponding to the major cutting edge is provided with a protruding portion protruding to the outside of the cutting insert, and, when viewed from above, the protruding portion has a first section in which a protrusion amount becomes smaller in a direction away from the corner edge.

The cutting insert according to the present invention preferably includes a first clearance angle changing portion in which a clearance angle becomes smaller as a flank corresponding to the major cutting edge separates from the corner edge, and a second clearance angle changing portion in which the clearance angle becomes larger as the flank separates from the corner edge, wherein the first clearance angle changing portion is preferably positioned closer to the corner edge than the second clearance angle changing portion is, and, of end portions of the first clearance angle changing portion, the value of the clearance angle at a distal end portion from the corner edge is preferably negative.

In the cutting insert according to the present invention, it is preferred that the value of a clearance angle of the protruding portion is positive.

The cutting insert according to the present invention preferably further includes a second section in which the protrusion amount becomes larger as the protruding portion separates from the corner edge, wherein the second section is preferably positioned closer to the corner edge than the first section is.

In the cutting insert according to the present invention, when viewed from above, it is preferred that a starting end of the first section of the protruding portion be positioned closer to the corner edge than to an intermediate position of the major cutting edge.

The cutting insert according to the present invention is attached to a body that rotates about a rotation axis. This cutting insert includes: a first end surface including a rake face; a second end surface that comes into contact with the body when the cutting insert is attached to the body; a side surface that includes a minor cutting edge side surface portion connecting the first end surface and the second end surface and facing in a direction of the rotation axis, and a major cutting edge side surface portion connecting the first end surface and the second end surface and facing in an outer radial direction perpendicular to the rotation axis; a major cutting edge formed in an intersecting ridge line portion between the first end surface and the major cutting edge side surface portion; a minor cutting edge formed in an intersecting ridge line portion between the first end surface and the minor cutting edge side surface portion; and a corner cutting edge connecting the major cutting edge and the minor cutting edge. A through-hole penetrating the first end surface and the second end surface is formed. The major cutting edge side surface portion includes a protruding portion that protrudes in a direction perpendicular to the major cutting edge when the first end surface is viewed from a direction parallel to a central axis of the through-hole and includes a second section in which a protrusion amount with respect to the major cutting edge increases in a direction away from the corner cutting edge and a first section that is connected to the second section and in which the protrusion amount decreases in the direction away from the corner cutting edge. This protruding portion has a first clearance angle changing portion in which the value of a clearance angle decreases in the direction away from the corner cutting edge, and a second clearance angle changing portion which is formed farther away from the corner cutting edge than the first clearance angle changing portion is and in which the value of a clearance angle increases in the direction away from the corner cutting edge. Furthermore, it is preferred that the length of the major cutting edge connected to the second clearance angle changing portion be greater than the length of the major cutting edge connected to the first clearance angle changing portion.

Furthermore, a sum of the length of the major cutting edge connected to the first clearance angle changing portion and the length of the major cutting edge connected to the second clearance angle changing portion is preferably greater than 10% of the length of the entire major cutting edge, or more preferably greater than 20% thereof.

DETAILED DESCRIPTION

An embodiment of the present invention is now described hereinafter with reference to the drawings. For the convenience of explanation, words describing the relative positional relationship between two objects, such as "up" and "down," may be used, but in that case, such words merely describe the positional relationship shown in each drawing and are not intended to specify the absolute positional relationship between the two objects. In other words, such a description as "an object A is located above an object B" merely means that the positional relationship between the object A and the object B is illustrated in a specific drawing and does not mean that the object A is always absolutely located above the object B.

A cutting insert 10 of the present embodiment includes an upper surface 20 (an example of the "first end surface"), a lower surface 30 (an example of the "second end surface") disposed opposite the upper surface 20, and a side surface 40 connecting the upper surface 20 and the lower surface 30. The cutting insert 10 includes a through-hole 50 extending from the upper surface 20 to reach the lower surface 30, and a screw is inserted into this through-hole 50 when the cutting insert 10 is fixed to a body 101.

When viewed from above (in a case where the through-hole 50 is formed in the cutting insert 10, and when the upper surface 20 is viewed from the direction facing the upper surface 20, which is the direction parallel to a central axis of the through-hole 50), the upper surface 20 is in the shape of substantially a parallelogram in which a pair of substantially parallel side ridges is longer than the other pair of substantially parallel side ridges, and the upper surface 20 is rotationally symmetric with respect to the central axis of the through-hole 50 by 180°.

Figure 3:
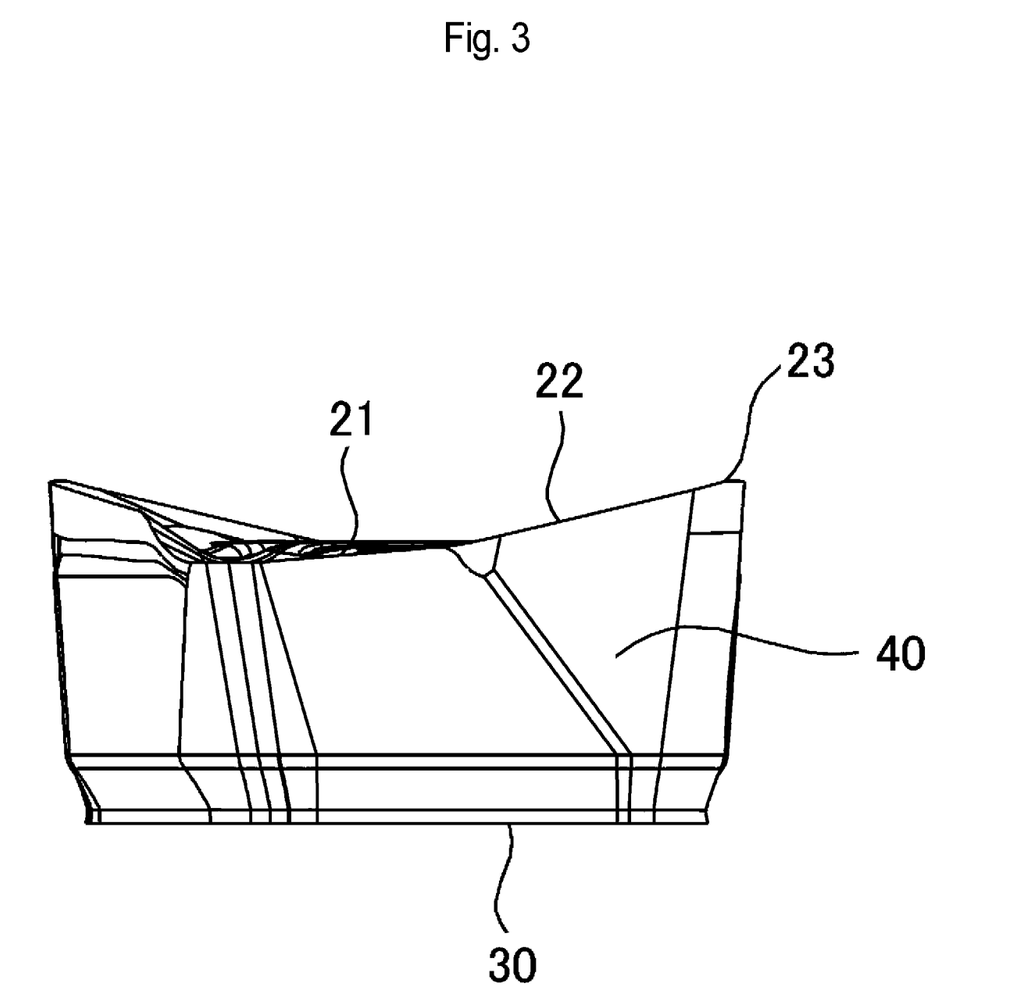
FIG. 3 is a bottom view of the insert shown in FIG. 1.

A part of an intersecting ridge line portion between the upper surface 20 and the side surface 40 constitutes a cutting edge used for cutting. Specifically, the side ridges on the shorter sides of the upper surface 20 constitute minor cutting edges including inner cutting edges 21 and flat cutting edges 22, and corner portions of the upper surface 20 constitute corner cutting edges 23, and the side ridges on the longer sides of the upper surface 20 constitute major cutting edges 24. In the present embodiment, the inner cutting edges 21, the flat cutting edges 22, the corner cutting edges 23 and the major cutting edges 24 are connected in this order. When viewed from above, the inner cutting edges 21 and the flat cutting edges 22 intersect with each other at an obtuse angle, and these intersections are each configured by an arc having an extremely small curvature radius. The value of a clearance angle of a side surface section connected to the inner cutting edges 21 and the flat cutting edges 22 (an example of the "minor cutting edge side surface portion" that includes a flank and faces in the direction of the rotation axis of the body 101 (FIG. 7) when the cutting insert 10 is attached to the body 101) is positive. As shown in FIG. 3, when viewed in the direction facing the flank of the inner cutting edges 21 and the flat cutting edges 22, the inner cutting edges 21 and the flat cutting edges 22 are tilted toward the corner cutting edges 23 in the direction away from the lower surface 30, and the inclination angle of the flat cutting edges 22 is greater than that of the inner cutting edges 21.

Figure 4:
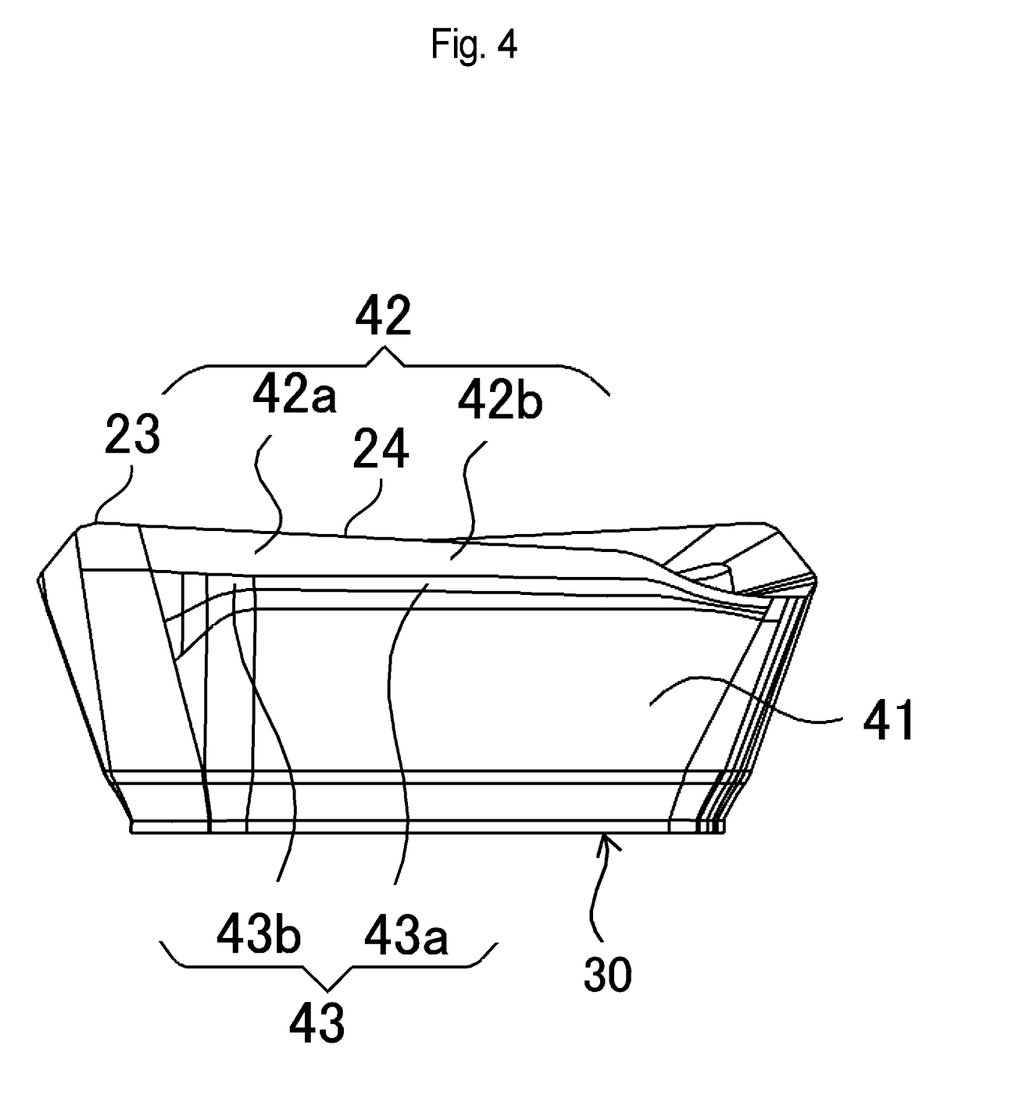
FIG. 4 is a right side view of the insert shown in FIG. 1.
Figure 5:
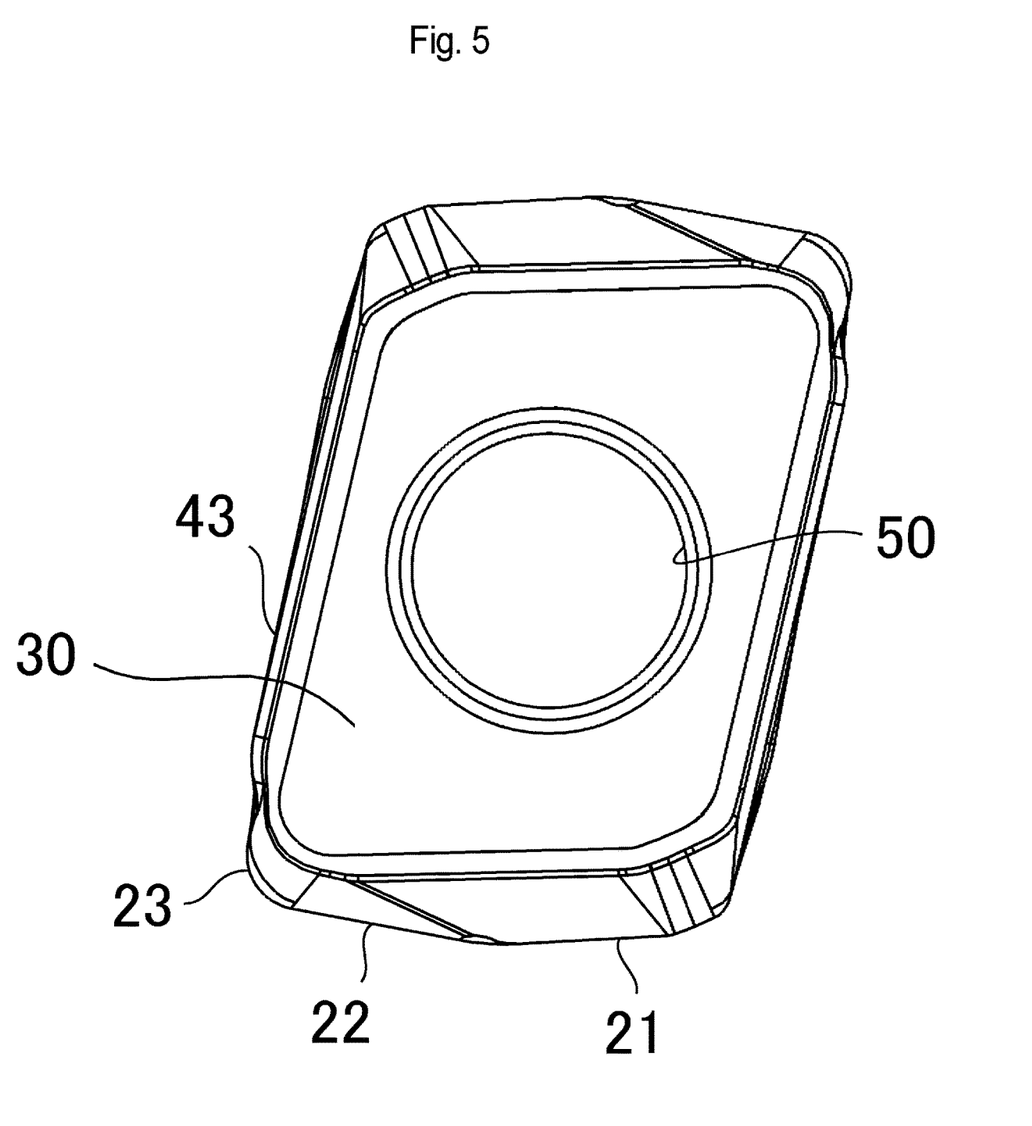
FIG. 5 is a rear view of the insert shown in FIG. 1.
Figure 6:
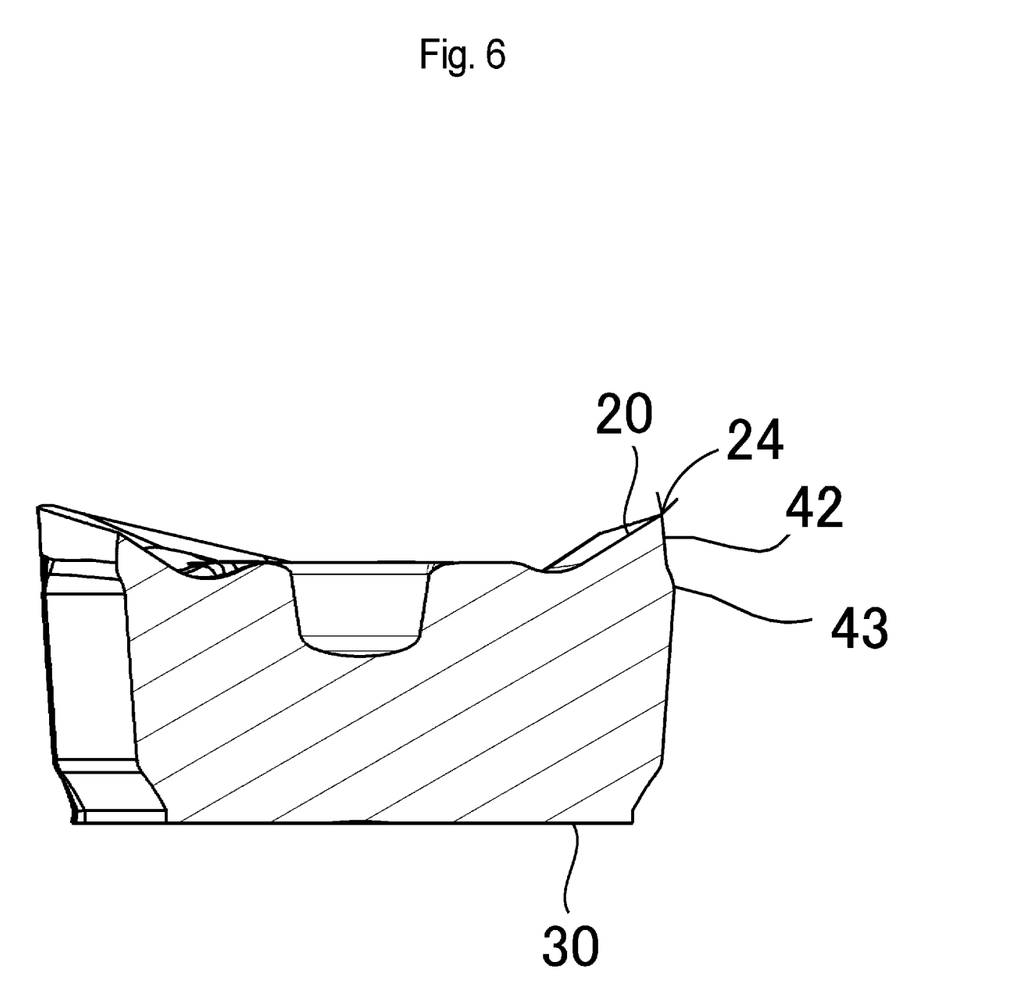
FIG. 6 is a cross-sectional view taken along VI-VI of FIG. 1.

As shown in FIG. 4, the major cutting edges 24 gradually approach the lower surface 30 from the connection with the corner cutting edges 23 toward the other inner cutting edge 21 (the inner cutting edge 21 that is rotationally symmetric with the other inner cutting edge 21 with respect to the central axis of the through-hole 50 by 180 degrees). A side surface portion 41 of the side surface 40 that faces in the outer radial direction with reference to the rotation axis of the body 101 and corresponds to the major cutting edges 24 when the cutting insert 10 is attached to the body 101 (FIG. 7) has a major cutting edge flank portion 42 that is adjacent to the major cutting edges 24 and constitutes the flank.

The major cutting edge flank portion 42 has a first clearance angle changing portion 42a where a clearance angle becomes smaller toward a negative value in the direction away from the corner cutting edges 23, and a second clearance angle changing portion 42b where the clearance angle becomes larger toward a positive value in the direction away from the corner cutting edges 23. The first clearance angle changing portion 42a is formed over a predetermined length from the connection between the major cutting edges 24 and the corner cutting edges 23, and the second clearance angle changing portion 42b is connected to the first clearance angle changing portion 42a. In other words, the first clearance angle changing portion 42a is positioned closer to the corner cutting edges 23 than the second clearance angle changing portion 42b is. The clearance angle at a starting end of the first clearance angle changing portion 42a is approximately 0° and becomes smaller in the direction away from the corner cutting edges 23. The value of this clearance angle becomes negative at the intersection with the second clearance angle changing portion 42b. In the present embodiment, the clearance angle of the first clearance angle changing portion 42a is −5° at the intersection with the second clearance angle changing portion 42b. For example, the first clearance angle changing portion 42a can be formed in such a manner that the clearance angle in the first clearance angle changing portion 42a monotonically decreases in the direction from the corner cutting edges 23. The clearance angle at a starting end of the second clearance angle changing portion 42b becomes larger in the direction away from the corner cutting edges 23. For example, the second clearance angle changing portion 42b can be formed in such a manner that the clearance angle in the second clearance angle changing portion 42b monotonically increases in the direction away from the corner cutting edges 23. In the present embodiment, the clearance angle at a tail end of the second clearance angle changing portion 42b is −3°.

Figure 1:
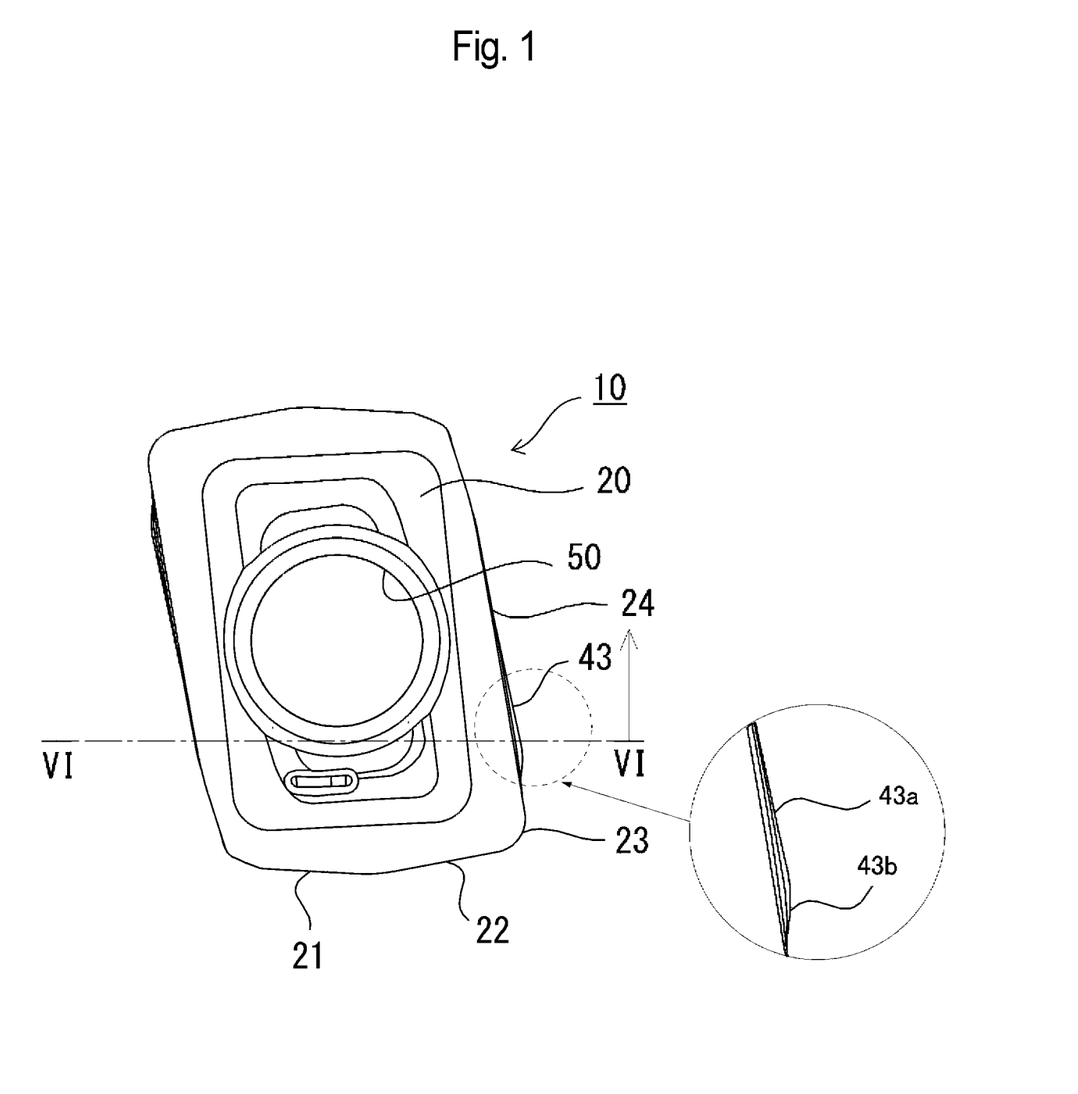
FIG. 1 is a front view of an insert according to an embodiment of the present invention.
Figure 2:
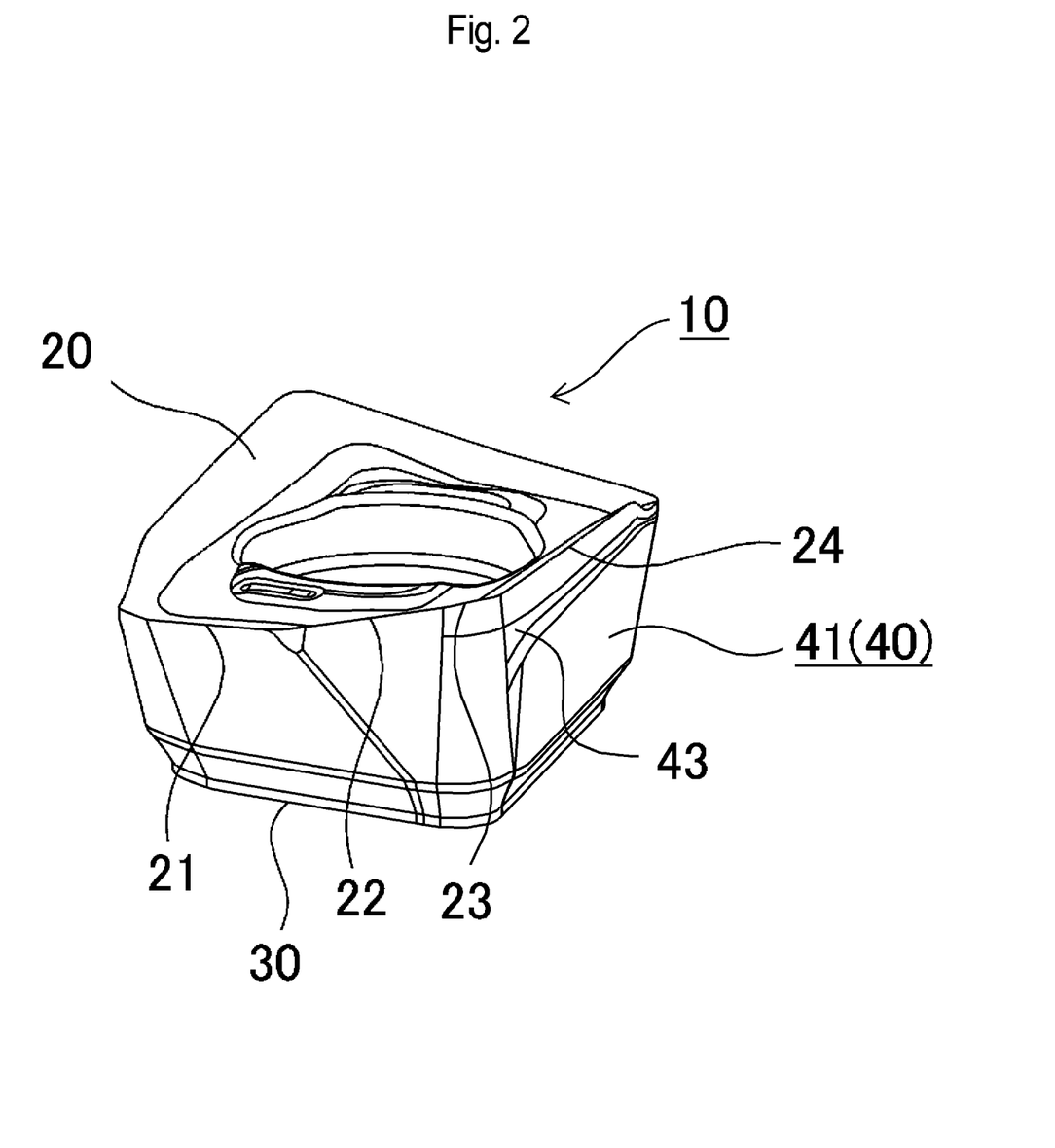
FIG. 2 is a perspective view of the insert shown in FIG. 1.

As shown in FIG. 1, when viewed from above, the major cutting edge flank portion 42 protrudes farther out than the major cutting edges 24 and configures a protruding portion 43. The protruding portion 43 has a first section 43a where the protrusion amount becomes smaller in the direction away from the corner cutting edges 23, and a second section 43b where the protrusion amount becomes larger in the direction away from the corner cutting edges 23. Note that the protrusion amount means the distance from the major cutting edges 24 to an end of the protruding portion 43 when viewed cross-sectionally in the direction perpendicular to the major cutting edges 24, that is, the distance between the major cutting edges 24 and the point of the end of the protruding portion 43 in the direction perpendicular to the major cutting edges 24 when viewed from above in FIG. 1

(when the upper surface 20 is viewed from a direction parallel to a central axis of the through-hole 50). The second section 43b may include the connection between the major cutting edge 24 and the corner cutting edges 23. The first section 43a is connected to the second section 43b.

A starting end of the first section 43a of the protruding portion 43 is positioned closer to the corner cutting edges 23 than to an intermediate position of the major cutting edges 24 when viewed from above.

The value of the clearance angle of the protruding portion 43 is positive and is constant at all areas. In the present embodiment, the clearance angle of the protruding portion 43 is 4°. The clearance angle of the protruding portion 43 is a clearance angle of a surface connected to the lower surface 30 with respect to the major cutting edge flank portion 42, which is the angle formed by a line segment formed by the side surface portion 41 extending from the protruding portion 43 to the lower surface 30 in a cross section perpendicular to the rotation axis, and a tangent of a workpiece the protruding portion 43 faces.

The side surface portion 41 of the cutting insert 10 described above has the protruding portion 43 protruding in the direction perpendicular to the major cutting edges 24 when the upper surface 20 is viewed in the direction parallel to the central axis of the through-hole 50. Thus, in the cross section perpendicular to the major cutting edges 24, the protruding portion 43 protrudes more than the major cutting edges 24 in the direction perpendicular to the central axis of the through-hole 50. As shown in FIG. 1, this protrusion amount gradually increases from the vicinity of the connection between the major cutting edges 24 and the corner cutting edges 23 in the direction away from the corner cutting edges 23, and becomes the maximum in the vicinity of the corner cutting edge 23. The protrusion amount then gradually decreases in the direction away from the corner cutting edges 23. The protruding portion 43 is formed in such a manner that the length of the corresponding major cutting edge 24 from the position where the protrusion amount of the protruding portion 43 is the maximum to the position where the protrusion amount becomes zero is greater than, such as at least twice as long as, the length of the corresponding major cutting edge 24 from the position where the protrusion amount is zero to the position where the protrusion amount becomes the maximum, in the direction away from the corner cutting edges 23. Furthermore, the sum of the length of the major cutting edge 24 connected to the first clearance angle changing portion 42a and the length of the major cutting edge 24 connected to the second clearance angle changing portion 42b is preferably greater than 10% of the length of the entire major cutting edges 24, or more preferably by more than 20%.

When the cutting insert 10 is viewed in a cross section passing through the central axis of the through-hole 50, the upper surface 20 is formed in such a manner that the distance from the lower surface 30 becomes greater in the direction toward the major cutting edges 24. Therefore, a positive rake angle (radial lake) can easily be realized, improving the sharpness of the cutting insert 10. Also, the major cutting edge flank portion 42 is formed in such a manner that the distance from the central axis (distance in the direction perpendicular to the central axis) becomes greater in the direction away from the major cutting edges 24. Therefore, the thickness of the cutting insert 10 increases, a decrease in edge strength due to reduction in cutting resistance can be suppressed, and particularly damage due to the load applied to the cutting edges after biting into the workpiece can be prevented.

In addition, the protruding portion 43 is formed so as to have the maximum protrusion amount, in a region in the vicinity of the corner cutting edges 23, such as in the vicinity of the corner cutting edges separated from the corner cutting edges 23 by 20% or less with respect to the entire length of the major cutting edges 24 (the entire length of one side ridge portion constituting the major cutting edges 24). For this reason, the thickness of a part of the major cutting edge 24 in the vicinity of the portion that the cutting edge first bites in, can particularly be increased. Furthermore, by providing the protruding portion 43, the clearance angle is reduced as compared with when the protruding portion 43 is not provided, facilitating chips to move in the direction away from the corner cutting edge 24. In this case, since the clearance angle becomes larger in the direction away from the corner cutting edges 24 due to the first section 43a of the protruding portion 43, the chips that are caught between the workpiece and a wall surface can be prevented from damaging the wall surface.

Figure 7:
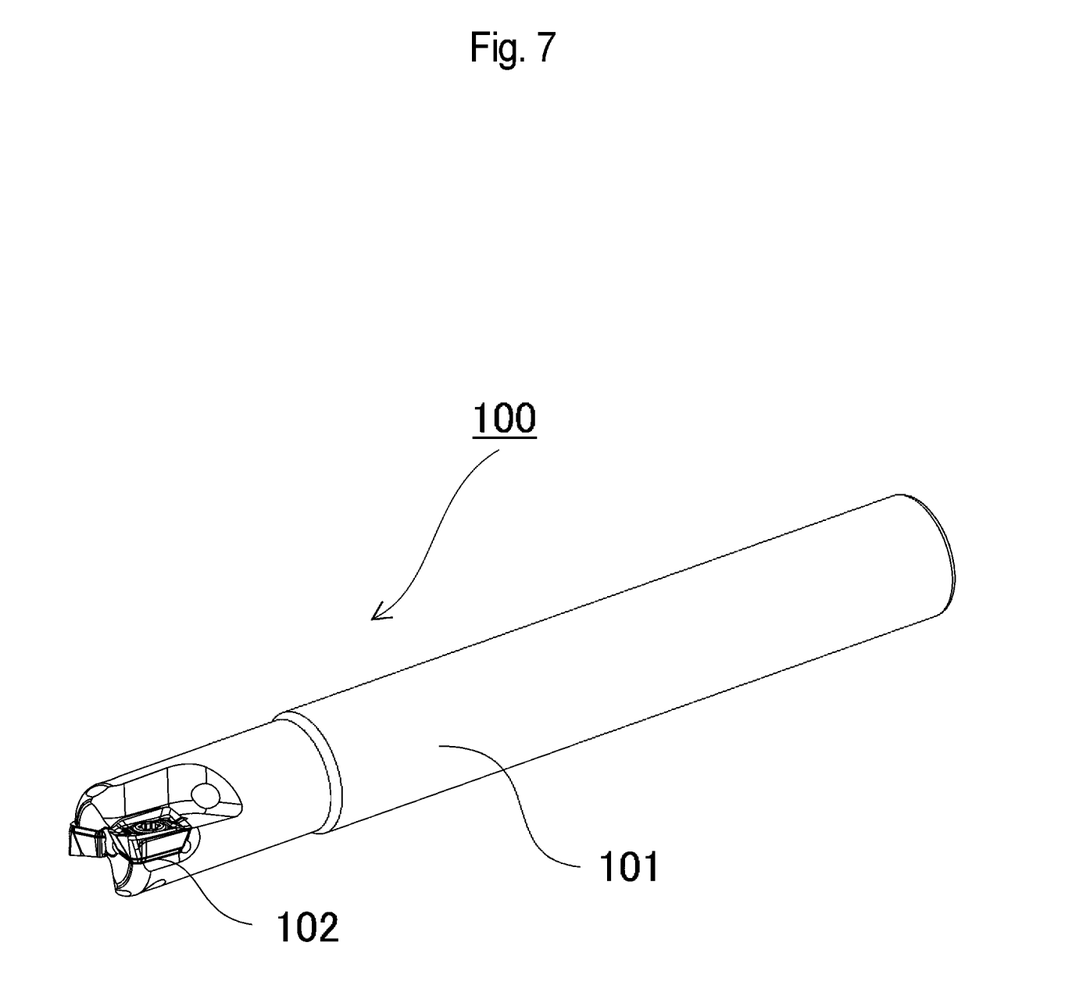
FIG. 7 is a perspective view of a cutting tool with a replaceable blade edge according to an embodiment of the present invention.
Figure 8:
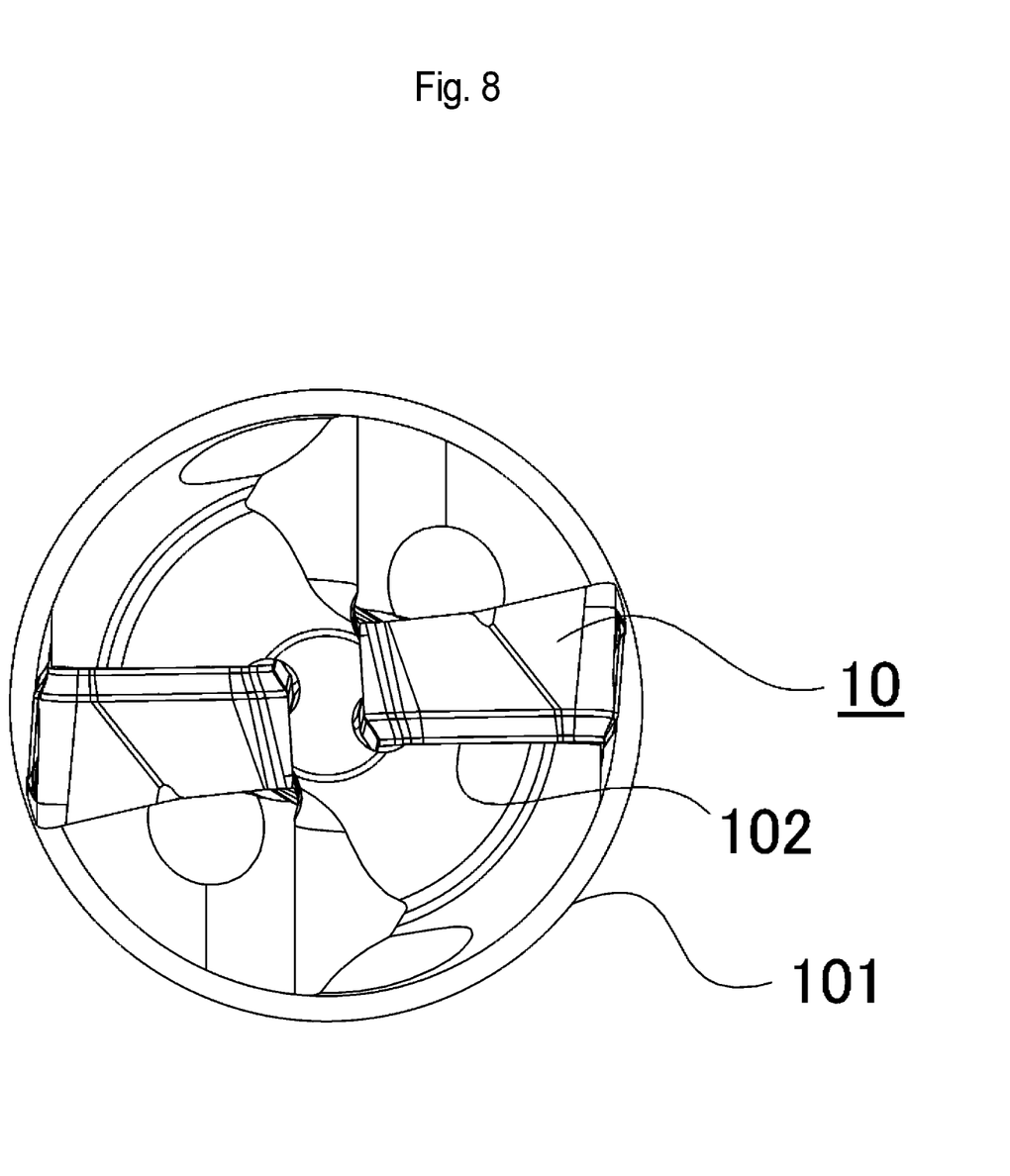
FIG. 8 is a diagram showing a tip of the cutting tool with a replaceable blade edge shown in FIG. 7.
Figure 9:
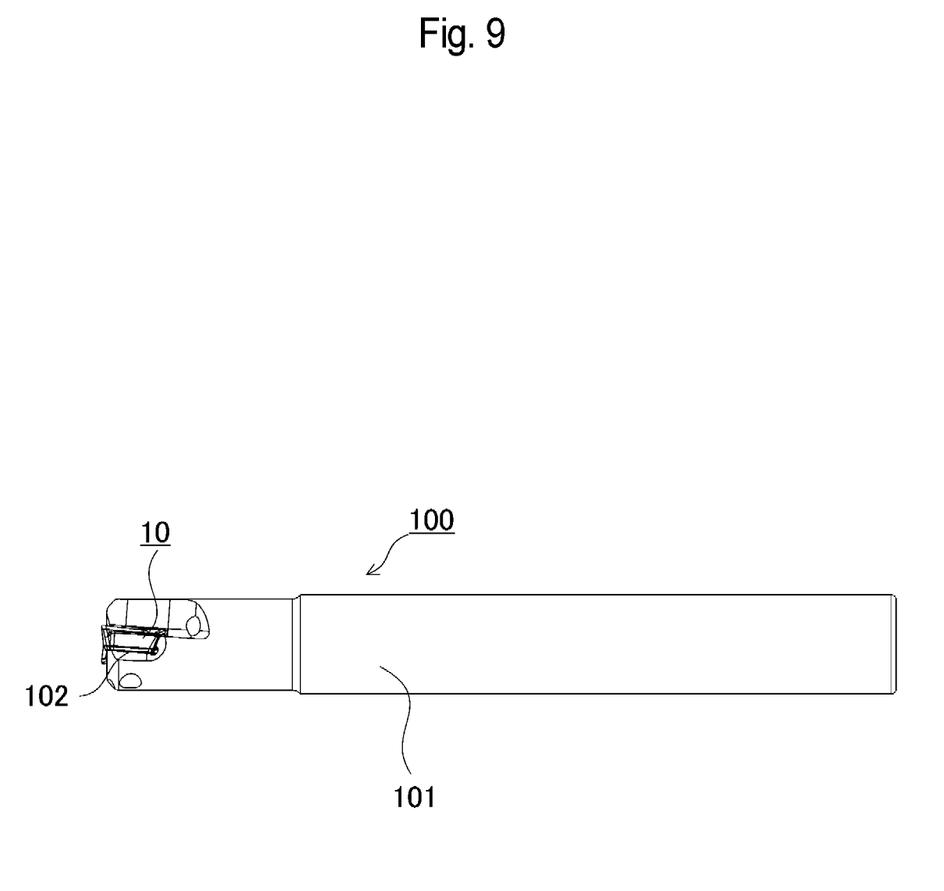
FIG. 9 is a front view of the cutting tool with a replaceable blade edge shown in FIG. 7.

A cutting tool with a replaceable blade edge that has the cutting insert of the present embodiment is described below. As shown in FIGS. 7 to 9, a cutting tool with a replaceable blade edge 100 is composed of the substantially cylindrical body 101 and the cutting insert 10 attached to a tip of the body 101. Two chip bases 102 are formed at the tip of the body 101. The cutting insert 10 is inserted into the through-hole 50 and is mounted and fixed on the chip bases 102 by male screws screwed into female screws formed on the chip bases 102. The upper surface 20 of the cutting insert 10 functions as a rake surface, and at least a part of the lower surface 30 is in abutment with the chip bases 102. In this case, the upper surface 20 faces in the direction of rotation of the body 101. The side surface section ("minor cutting edge side surface portion") connected to the inner cutting edges 21 and the flat cutting edges 22 faces in the direction of the rotation axis of the body 101, and the side surface portion 41 connected to the major cutting edges 24 faces in the outer radial direction perpendicular to the direction of the rotation axis of the body 101. The cutting insert 10 is attached in such a manner that the inner cutting edges 21 and the flat cutting edges 22 are positioned at the tip side of the body 101 and that the flat cutting edges 22 are approximately perpendicular to the rotation axis of the body 101. The cutting tool with a replaceable blade edge 100 performs flattening with the inner cutting edges 21 or flat cutting edges 22 and performs wall surface machining with the major cutting edges 24.

The effects of the foregoing embodiment are described next. Since the major cutting edge side surface portion 41 has the first section 43a of the protruding portion 43 where the protrusion amount becomes smaller in the direction away from the corner cutting edges 23, the major cutting edges 24 in the vicinity of the corner cutting edges 23 become thick. Consequently, the major cutting edges 24 become strong and are prevented from being damaged when biting into the workpiece.

Typically, the generated chips curl up as they stretch out, and tips of the chips are often caught between a rear portion of the cutting edge and the workpiece. The rear portion of the cutting edge means the part away from a tip of the cutting tool with a replaceable blade edge 100 in the cutting insert 10 attached to the body 101. Since a rear section of the major cutting edge flank portion 42 is shaped by combining the first section 43a of the protruding portion 43 of the major cutting edges 24 and the second clearance angle changing portion 42b, a sufficiently large gap is formed between the rear section and the machined wall surface. Accordingly, even when the chips are caught at the rear part of the major cutting edges 24 during a cutting process, the caught chips cannot easily damage the cutting insert 10 or machined surface.

In the case of the cutting insert 10 of the present embodiment, since the second section 43b of the protruding portion 43 is formed at a position closer to the corner cutting edges 23 than the first section 43a of the protruding portion 43 is, the shape of the corner cutting edges 23 changes smoothly from the first section 43a to the flank, thereby increasing the strength of the first section 43a.

Since the value of the clearance angle of the protruding portion 43 is positive, the gap between the machined wall surface and the cutting insert 10 is further increased, and therefore the cutting insert 10 and the machined surface are not damaged easily.

Since the starting end of the first section 43a of the protruding portion 43 is positioned closer to the corner cutting edges 23 than to the intermediate position of the major cutting edge 24 when viewed from above, parts of the major cutting edges 24 that are easily damaged can effectively be reinforced.

What is claimed is:

1. A cutting insert, comprising a first end surface and a second end surface that have a plurality of side ridges and face each other, and a side surface connecting these two end surfaces, wherein
    a cutting edge is formed in at least a part of an intersecting ridge line portion only between the first end surface and the side surface;
    the cutting edge has an inner cutting edge, a flat cutting edge connected to the inner cutting edge, a corner edge connected to the flat cutting edge, and a major cutting edge connected to the corner edge;
    a major cutting edge side surface portion which is a part of the side surface and corresponds to the major cutting edge; wherein
    the major cutting edge side surface portion has:
        a protruding portion protruding outward, and
        a major cutting edge flank portion adjacent to the major cutting edge;
    when viewed in a direction facing the first end surface, the protruding portion has a first section in which a protrusion amount becomes smaller in a direction away from the corner edge;
    the major cutting edge flank portion includes a first clearance angle changing portion in which a clearance angle becomes smaller in a direction away from the corner edge, and a second clearance angle changing portion in which a clearance angle becomes larger in the direction away from the corner edge; and
    the first clearance angle changing portion is positioned closer to the corner edge than the second clearance angle changing portion.

2. The cutting insert according to claim 1, wherein a value of a clearance angle of the protruding portion is positive.

3. The cutting insert according to claim 1, wherein the protruding portion further includes a second section in which the protrusion amount becomes larger in a direction away from the corner edge, and the second section is positioned closer to the corner edge than the first section is.

4. The cutting insert according to claim 1, wherein, when viewed in the direction facing the first end surface, a starting end of the first section of the protruding portion is positioned closer to the corner edge than an intermediate position of the major cutting edge.

5. A cutting insert to be attached to a body rotating about a rotation axis, comprising:
    a first end surface including a rake face;
    a second end surface that comes into contact with the body when the cutting insert is attached to the body;
    a side surface that includes a minor cutting edge side surface portion connecting the first end surface and the second end surface and facing in a direction of the rotation axis, and a major cutting edge side surface portion connecting the first end surface and the second end surface and facing in an outer radial direction perpendicular to the rotation axis;
    a major cutting edge formed in an intersecting ridge line portion only between the first end surface and the major cutting edge side surface portion;
    a minor cutting edge formed in an intersecting ridge line portion between the first end surface and the minor cutting edge side surface portion; and
    a corner cutting edge connecting the major cutting edge and the minor cutting edge, wherein
    a through-hole penetrating the first end surface and the second end surface is formed;
    the major cutting edge side surface portion includes a protruding portion that protrudes in a direction perpendicular to the major cutting edge when the first end surface is viewed from a direction parallel to a central axis of the through-hole and includes a second section in which a protrusion amount with respect to the major cutting edge increases in a direction away from the corner cutting edge and a first section that is connected to the second section and in which the protrusion amount decreases in the direction away from the corner cutting edge;
    the protruding portion has a first clearance angle changing portion in which a value of a clearance angle decreases in a direction away from the corner cutting edge, and a second clearance angle changing portion which is formed at a position farther away from the corner cutting portion than the first clearance angle changing portion and in which a value of a clearance angle increases in the direction away from the corner edge;
    a length of the major cutting edge connected to the second clearance angle changing portion is greater than a length of the major cutting edge connected to the first clearance angle changing portion,
    the major cutting edge side surface portion further includes a major cutting edge flank portion adjacent to the major cutting edge;
    the major cutting edge flank portion includes a first clearance angle changing portion in which a clearance angle becomes smaller in a direction away from the corner edge, and a second clearance angle changing portion in which a clearance angle becomes larger in the direction away from the corner edge; and
    the first clearance angle changing portion is positioned closer to the corner edge than the second clearance angle changing portion is.

6. The cutting insert according to claim 5, wherein a sum of the length of the major cutting edge connected to the first clearance angle changing portion and the length of the major cutting edge connected to the second clearance angle changing portion is greater than 10% of the length of the entire major cutting edge.

* * * * *